Figure 1:
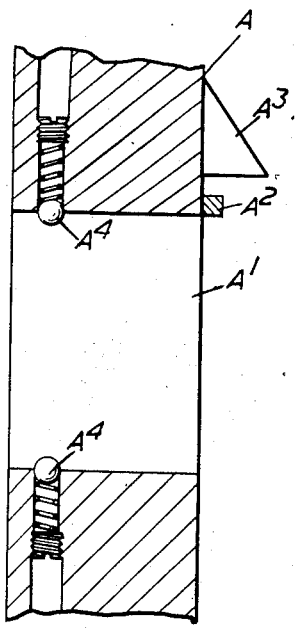

June 28, 1960  J. W. GEDDES  2,942,539
CAMERA LENS MOUNT FITTINGS

Filed Sept. 23, 1957  2 Sheets-Sheet 1

INVENTOR,
JOHN WALTER GEDDES, DECEASED,
BY AUDREY GEDDES, ADMINISTRATRIX

*Attorney*

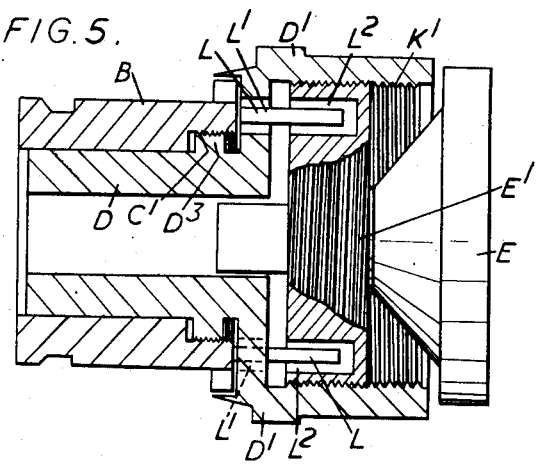
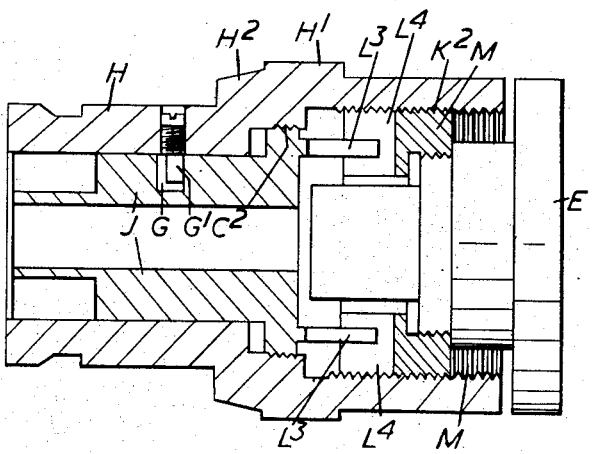
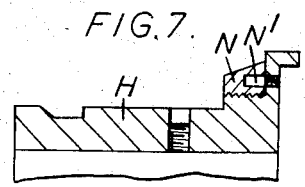

United States Patent Office 2,942,539
Patented June 28, 1960

2,942,539

CAMERA LENS MOUNT FITTINGS

John Walter Geddes, deceased, late of Leicester, England, by Audrey Geddes, legal representative, Leicester, England, assignor to Taylor, Taylor & Hobson Limited, Leicester, England, a company of Great Britain Filed Sept. 23, 1957, Ser. No. 685,639

Claims priority, application Great Britain Sept. 28, 1956

9 Claims. (Cl. 95—45)

This invention relates to a lens mount fitting for a camera, and is concerned more especially with movements for effecting focussing of the lens and with the indication of such movements by means of two types of distance scale respectively calibrated to read in different units, for example in feet and in metres. Where practicable, such indication can be effected by marking two scales on opposite sides of the lens mount and providing two indicating marks on the camera in positions to cooperate respectively with the two scales. But such an arrangement is often impracticable owing to interference of other parts of the camera with the viewing of such scales, and it frequently happens that there is only one available direction of view. For instance, on cameras with turret lenses, the other lenses on the turret will often obscure the view except from one direction.

The present invention has for its object to provide a lens mount fitting which will obviate this difficulty, whilst at the same time ensuring accurate registration of each lens mount scale with the indicator on the camera.

The camera lens mount fitting according to the invention comprises a cylindrical receiving opening on the camera within which the lens mount can slide, a member on the lens mount bearing two distance scales in different units having corresponding reference points angularly spaced around the member, a second lens mount member carrying two alternative keying elements angularly spaced apart to suit the angular spacing between the scale reference points, a keying element on the camera with which the two keying elements on the lens mount respectively cooperate in the two alternative angularly spaced positions in which the lens mount can be inserted in the receiving opening, a single indicator on the camera which cooperates respectively with the two distance scales in the said positions, cooperating means on the camera and on the lens mount for holding one of the two lens mount members in a predetermined axial position in the receiving opening, and means whereby relative rotation between the two lens mount members causes the lens optical unit to move axially relatively to such axially held member.

Preferably, the cooperating keying elements are so arranged as to hold the second lens mount member against rotation relatively to the camera.

The two lens mount members and the lens optical unit may be mounted relatively to one another in a variety of ways.

Thus, in some arrangements the two lens mount members are screwthreaded together or otherwise guided to perform relative helical movement, the lens optical unit being carried by that one of the two members which is not axially held in the camera receiving opening.

In other arrangements, the lens optical unit is screwthreaded or otherwise guided to perform helical movement relatively to one of the two lens mount members, and is held against rotation relatively to the other lens mount member. Thus, if the scaled lens mount member constitutes the member axially held in the camera receiving opening, the lens optical unit may be arranged to perform helical movement relatively thereto.

In one convenient arrangement for axially holding the lens mount member in the camera receiving opening, such member is provided with a peripheral recess, and a springy element is carried by the camera for engaging in such recess.

Where practicable it is preferable to provide such lens mount member with a shoulder which seats on the end face of the receiving opening.

It will usually be desirable to provide stop means for limiting the relative rotational movement between the two lens mount members.

Figure 2:
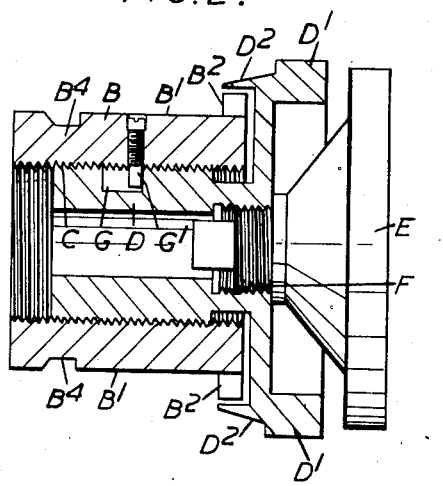
Figure 3:
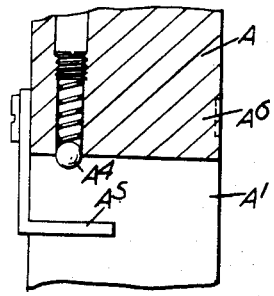
Figure 4:
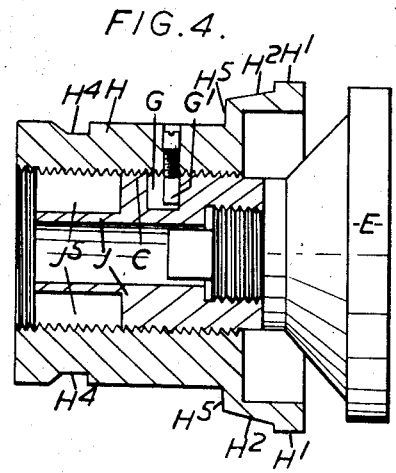

The invention may be carried into practice in various ways, but some convenient alternative practical arrangements of camera lens mount fitting according thereto will now be described with reference to the accompanying drawings, in which Figure 1 is a sectional view of a camera part having a cylindrical opening for receiving a lens mount, Figure 2 is a view in axial section of a lens mount to be received in the camera part of Figure 1, Figure 3 is a sectional view of an alternative camera part, Figure 4 is a view in axial section of a lens mount for the camera part of Figure 3, Figure 5 is a view in axial section of an alternative lens mount for the camera part of Figure 1, Figure 6 is a view in axial section of an alternative lens mount for the camera part of Figure 3, and Figure 7 shows a modification of the lens mount of Figure 4.

In the arrangement of Figures 1 and 2, the camera A (see Figure 1) is provided with a cylindrical receiving opening $A^1$ for the lens mount in the appropriate position relatively to the film plane, such opening in the case of a turret lens arrangement being in the movable turret. At the front end of such opening $A^1$ on one side thereof is a forwardly projecting key $A^2$ and also a further projection $A^3$ bearing a mark constituting the indicator on the camera for cooperating with a distance scale on the lens mount. At an appropriate depth within the cylindrical opening $A^1$, and projecting inwardly, are one or more spring catch members, which may consist for instance of spring ligaments or spring-pressed ball detents. In Figure 1 are shown two spring catch members each consisting of spring-pressed ball detents $A^4$.

The lens mount (see Figure 2) comprises a member B having a cylindrical outer surface $B^1$ which is a sliding fit in the camera receiving opening $A^1$, such member carrying at its front end an outwardly projecting flange $B^2$ having two slots in diametrically opposite positions. The two slots of the flange $B^2$ constitute keyways to receive, as a sliding fit, the key $A^2$ on the front end of the camera receiving opening $A^1$, the lens mount being inserted into such opening in one or other of two positions, wherein one of the keyways in the flange $B^2$ will engage with the key $A^2$ on the camera A. This lens mount member B is also provided towards its rear end with a peripheral groove $B^4$ in such a position as to be engaged by the spring catch members $A^4$ in the camera receiving opening $A^1$ when the camera key $A^2$ is in engagement in one of the two keyways in the flange $B^2$.

The lens mount member B is internally screwthreaded at C to receive another lens mount member D, into the front end of which the lens optical unit E is screwed at F. This member D at its front end is formed as a focussing ring $D^1$ surrounding the optical unit, the outer edge of this ring being appropriately roughened for hand operation. A more or less cylindrical flange $D^2$ projects rearwardly from this ring $D^1$ so as to surround the keyway flange $B^2$ on the other lens mount member B. This flange $D^2$ has engraved on its outer surface two distance scales, one in feet and the other in metres, the infinity marks on the two scales lying in diametrically opposite positions and each scale extending in one direction from its infinity mark around the flange $D^2$ for an angular distance of the order of 150 degrees.

The lens mount is inserted in the receiving opening $A^1$ in one or other of two diametrically opposite positions in accordance with which of the two distance scales is to be used, and is pushed in until the appropriate keyway in the flange $B^2$ engages over the key $A^2$ on the camera A and the spring catches $A^4$ on the camera A snap into the peripheral groove $B^4$. When the outer member B is thus spring-locked axially in position and also locked against rotation, the lens mount will expose on the flange $D^2$ the appropriate distance scale to view adjacent to the indicator mark on the projection $A^3$ on the camera A, and the focussing ring $D^1$ may be rotated to bring the desired distance mark on the scale on the flange $D^2$ adjacent to the indicator mark. The pitch of the screwthread C between the two lens mount members B and D is so related to the graduations on the scale that the lens optical unit E will always lie in the correct axial position relatively to the film plane of the camera A to correspond to the indicated distance mark on the scale. Each scale will of course have its graduations so marked as to allow for the axial movement of the focussing ring $D^1$ when it is rotated. The screwthread C on the scaled lens mount member D is interrupted by a slot G cut into the member, and a pin $G^1$ is screwed into the outer lens mount member B so as to project inwardly into such slot G. The angular length of this slot G corresponds to the angular length of either scale, the slot being arranged helically at the same pitch as the screwthread or alternatively (as shown) being of axial width large enough to allow for the axial relative movement. The two ends of the slot G constitute stops to limit the relative rotation of the two members B and D to the angular length of either scale.

In an alternative and preferred arrangement, shown in Figures 3 and 4, the key on the camera A (see Figure 3), instead of projecting from the front end of the receiving opening $A^1$, is in the form of a bent arm $A^5$ secured to the rear end of the opening, this arm $A^5$ projecting radially inward for a short distance and then forwardly in the axial direction. The indicator mark is in this case engraved on the front end face of the receiving opening, as indicated diagrammatically at $A^6$. In other respects the receiving opening $A^1$ is arranged as above described.

In this arrangement, the lens mount member H carrying the focussing ring $H^1$ fits within the camera receiving opening $A^1$ and is provided with the peripheral groove $H^4$ for engagement by the spring catches $A^4$ in the receiving opening $A^1$. Such member H is also provided with a shoulder $H^5$ which engages against the front end face of the camera receiving opening $A^1$, and the two distance scales are engraved at $H^2$ on the periphery of the member H between the shoulder $H^5$ and the focussing ring $H^1$. The key $A^5$ on the camera A projects sufficiently far inwardly not to engage with such lens mount member H, which is consequently free to rotate, but is held by the catches $A^4$ against axial movement.

The other lens mount member J is in screwthreaded engagement at C within the scaled member H, and is provided at its rear end with two slots $J^5$ in diametrically opposite positions, either one of which can engage as a sliding fit on the camera key $A^5$ when the lens mount is inserted into the receiving opening. The optical unit E is in this case screwed into the front end of the inner keyed member J.

In this arrangement, rotation of the focussing ring $H^1$ will cause the keyed member J to move axially, carrying with it the optical unit E, whose axial focussing movement corresponds appropriately to the graduations on the scales on the periphery of the outer member H at $H^2$. The camera key $A^5$ and the keyway slots $J^5$ must of course be of sufficient length to remain in keying engagement throughout the whole range of focussing movement, which as in the first arrangement is limited by a stop pin $G^1$ carried by the outer member H engaging in a slot G in the inner member J.

Each of the above described arrangements may be modified, if desired, to avoid or reduce relative axial movement of the two lens mount members. Thus, the two lens mount members, instead of being screwthreaded to one another through a quick-pitch thread, may be in engagement through suitable collars or through a fine-pitch thread, so that the scaled member can rotate relatively to the keyed member but cannot move axially relatively thereto or will move axially only through a very short distance. The optical unit is then so mounted that it is in screwthreaded engagement at the appropriate pitch with one of the two members and is keyed against rotation relatively to the other member, whereby rotation of the focussing ring will cause the necessary axial focussing movement of the optical unit.

Figure 5 shows a modification of the arrangement of Figure 2 for the purpose of reducing axial movement of the scaled focussing ring $D^1$. The keyed lens mount members B is internally screwthreaded at its front end at $C^1$ for engagement with a corresponding external screwthread on a peripheral projection $D^3$ on the scaled focussing member D to the rear of the focussing ring $D^1$. The cooperating screwthreads $C^1$ are of fine-pitch so that when the focussing ring $D^1$ is rotated, the axial movement of the member D relative to the member B is only small. The optical unit E carries an annular flange $E^1$ externally screwthreaded at $K^1$ for engagement with a corresponding internal screwthread on the scaled focussing member D to the front of the focussing ring $D^1$. Keying means are provided for preventing rotation of the optical unit E relatively to the keyed lens mount member B. The cooperating screwthreads K are of coarse-pitch so that when the focussing ring $D^1$ is rotated a considerable axial movement of the optical unit E is produced in accordance with the scales engraved on the member D. The keying means for the optical unit E conveniently consists of a pair of diametrically opposite elongated keys L projecting forwardly from the keyed lens mount member B through a pair of arcuate slots $L^1$ in the scaled focussing member D into keyways constituted by diametrically opposite slots $L^2$ in the flange $E^1$ on the optical unit E, so that the optical unit E is keyed against rotation relatively to the member B but is free to move axially relatively thereto when the scaled focussing member D is rotated. The arcuate slots $L^1$ in the focussing member D each extend over an angle corresponding to the angle over which each of the engraved scales on the member D extends, i.e. about 150° so that the opposite ends of each slot $L^1$ constitute stops for limiting relative rotation of the lens mount members B and D and thus also limiting axial movement of the optical unit E.

Figure 6 shows a modification of the arrangement of Figure 4 for the purpose of reducing axial movement of the keyed inner lens mount member J. The outer scaled member H is internally screwthreaded at $K^2$ to the front of the focussing ring $H^1$ for engagement with an external screwthread on a member M into the front end of which the optical unit E is screwed. The inner and outer lens mount members J and H engage through fine-pitch screwthreads $C^2$ whilst the screwthread $K^2$ is of coarse-pitch. The member M carrying the optical unit E is keyed to the inner keyed lens mount member J by means of forwardly projecting keys $L^3$ on the member J and keyway slots $L^4$ on the member M. When the scaled member H is rotated only small axial movement of the keyed member J is produced through the fine-pitch screwthread $C^2$ whilst considerable axial movement of the keyed member M carrying the optical unit E is produced through the coarse-pitch screwthread $K^2$. The range of focussing movement is again limited by a stop pin $G^1$ carried by the outer member H engaging in a slot G in the inner member J.

It will be appreciated that the foregoing arrangements have been described by way of example only and may be modified in a variety of ways within the scope of the invention. For instance, to facilitate the engraving of the two scales, the surface bearing such scales may be formed on a separate part rigidly secured to the scale-carrying lens mount member. In Figure 7 the arrangement of Figure 4 is shown modified by the provision of such a separate part N on which the two scales are engraved, the part N being rigidly fixed to the lens mount member H by means of a locking pin $N^1$. Again, it is not essential to the invention that the two alternative positions for insertion of the lens mount into the camera receiving opening should be angularly spaced apart by 180°, although that will usually be most convenient. Further, the quick-pitch screwthread controlling the focussing movement may be replaced, if desired, by an equivalent coupling device, for example of the pin and helical slot type. Again, although it will usually preperable for the keying between the camera receiving opening and the lens mount member to be such as to limit relative movement strictly to axial movement, since this greatly facilitates accurate registering of the scales with the camera indicator, this arrangement is not essential to the invention, and other forms of keying can be employed provided that adequate care is taken to ensure accurate registering of the scales.

What is claimed as the invention and desired to secure by Letters Patent is:

1. A camera lens mount fitting, comprising a generally cylindrical receiving opening on the camera for receiving a detachable lens mount in either of two alternative operative positions, a sliding surface on the lens mount capable of sliding freely within such receiving opening during attachment and detachment of the lens mount, a lens optical unit within the lens mount, a lens mount member bearing two distance scales in different units having corresponding reference points angularly spaced apart around the said lens mount member, a second lens mount member, two alternative keying elements carried by such second lens mount member and angularly spaced apart to suit the angular spacing between the scale reference points, a keying element on the camera with which the two keying elements on the lens mount respectively cooperate in the two alternative angularly spaced operative positions into which the lens mount can be inserted in the receiving opening, a single indicator on the camera which cooperates respectively with the two distance scales in the said two operative positions, cooperating means on the camera and on the lens mount for holding one of the two lens mount members in the correct axial position in the receiving opening when the lens mount has been inserted into either of its operative positions, and means whereby relative rotation between the two lens mount members causes the lens optical unit to move axially relatively to such axially held member.

2. A camera lens mount fitting as claimed in claim 1, including means whereby the cooperating keying elements hold the second lens mount member against rotation relatively to the camera.

3. A camera lens mount fitting as claimed in claim 2, including means for guiding the lens optical unit to perform helical movement relatively to the scaled lens mount member, and means for holding such optical unit against rotation relatively to the other lens mount member.

4. A camera lens mount fitting as claimed in claim 3, in which the scaled lens mount member carries a peripheral recess and the camera carries a springy element engaging in such recess to hold the scaled lens mount member against axial movement.

5. A camera lens mount fitting as claimed in claim 4, in which the scaled lens mount member includes a shoulder seating on the end face of the camera receiving opening.

6. A camera lens mount fitting as claimed in claim 2, including means for guiding the lens optical unit to perform helical movement relatively to one of the two lens mount members, and means for holding such optical unit against rotation relatively to the other lens mount member.

7. A camera lens mount fitting as claimed in claim 2, including means for constraining the two lens mount members to perform relative helical movement, and means whereby the optical unit is carried by the lens mount member not axially held in the camera receiving opening.

8. A camera lens mount fitting as claimed in claim 1, in which the lens mount member axially held in the camera receiving opening carries a peripheral recess, and the camera carries a springly element engaging in such recess to hold such lens mount member against axial movement.

9. A camera lens mount fitting as claimed in claim 1, including stop means for limiting the relative rotational movement between the two lens mount members.

References Cited in the file of this patent

UNITED STATES PATENTS

| | | |
|---|---|---|
| 1,848,402 | Wollensak | Mar. 8, 1932 |
| 2,053,231 | Taylor | Sept. 1, 1936 |
| 2,126,300 | Wittel | Aug. 9, 1938 |
| 2,432,479 | Lee | Dec. 9, 1947 |
| 2,536,500 | Hinden | Jan. 2, 1951 |